United States Patent [19]

Alexius

[11] Patent Number: 4,995,587
[45] Date of Patent: Feb. 26, 1991

[54] MOTION AMPLIFIER EMPLOYING A DUAL PISTON ARRANGEMENT

[75] Inventor: Richard C. Alexius, Orlando, Fla.

[73] Assignee: Martin Marietta Corporation, Bethesda, Md.

[21] Appl. No.: 431,272

[22] Filed: Nov. 3, 1989

[51] Int. Cl.$^5$ .............................................. F16K 31/04
[52] U.S. Cl. ................................. 251/129.06; 251/57; 310/311; 310/328; 92/84
[58] Field of Search ........................... 251/129.06, 57; 310/328, 311; 92/84; 60/326

[56] References Cited

U.S. PATENT DOCUMENTS

| | | |
|---|---|---|
| 2,509,472 | 5/1950 | Billeter . |
| 2,652,033 | 9/1953 | Shafer . |
| 2,696,197 | 12/1954 | Forwald . |
| 2,847,033 | 8/1958 | Baker ........................................ 92/84 |
| 2,925,986 | 2/1960 | Woods ..................................... 251/57 |
| 3,501,099 | 3/1970 | Benson . |
| 3,551,764 | 12/1970 | Evans . |
| 3,598,506 | 8/1971 | O'Neill . |
| 3,809,110 | 5/1974 | Severinsson ...................... 251/57 X |
| 3,877,226 | 4/1975 | Blum . |
| 4,318,023 | 3/1982 | O'Neill . |
| 4,471,256 | 9/1984 | Igashira et al. . |
| 4,477,056 | 10/1984 | Alexius . |
| 4,629,039 | 12/1986 | Imoto et al. ................... 310/328 X |

FOREIGN PATENT DOCUMENTS

2425599 1/1980 France ........................... 251/129.06
0129481 7/1985 Japan ........................... 251/129.06

*Primary Examiner*—Arnold Rosenthal
*Attorney, Agent, or Firm*—Julian C. Renfro; Michael L. Slonecker; Gay Chin

[57] ABSTRACT

An electromechanical motion amplifier in accordance with this invention is useful for controllably converting an input displacement into an amplified output displacement. This device comprises a first piston movable within a predetermined range of travel along an axis in response to the input displacement, and a second piston movable within a predetermined amplified range of travel along such axis. Force transmission means cooperating with the first and second pistons is utilized for effecting movement of the second piston in response to movement of the first piston. The relationship between the first and second pistons is such that movement of the first piston along the axis produces amplified movement of the second piston along the axis in a selected direction. In a preferred embodiment, the force transmission means is an elastomer, and the second piston is connected to a valve located in a nearby chamber, so as to directly control the positioning of the valve. The chamber is designed to contain a fluid under pressure, and the valve is designed to interact with a valve seat located on an outlet in the sidewall of the chamber. The positioning of the valve with respect to the valve seat thus serves to selectively control the flow of fluid out of the chamber.

15 Claims, 2 Drawing Sheets

MOTION AMPLIFIER EMPLOYING A DUAL PISTON ARRANGEMENT

BACKGROUND OF THE INVENTION

1. Technical Field

The present invention relates to the field of electromechanical motion amplifiers having an active module of electroexpansive material, such as piezoelectric material. Two pistons are utilized, with force transmission means, preferably in the form of an elastomer, for effecting an amplified movement of the second piston in response to movements of the first piston.

2. Background Art

Several devices utilizing motion amplifiers having a pair of differential-area pistons separated by a hydraulic medium and driven by a piezoelectric stack are known to the prior art. In all instances where both pistons move along the same axis, they move in the same direction, and in one particular instance, the hydraulic medium is specifically identified as comprising mercury. In all the other arrangements with which I am familiar, the hydraulic medium is generically identified as "hydraulic fluid." None of the prior art devices to which I have reference discusses the need for, nor discloses, a highly advantageous temperature compensating mechanism.

The instant invention distinguishes over the relevant prior art teachings in three key respects. First, by the preferred use of an elastomer as the hydraulic medium. Second, by its inclusion of a temperature compensating mechanism, and third, by its ingenious structural arrangement wherein the two pistons move along the same axis, but in opposite directions. These distinguishing features appear to be particularly significant.

By comparison with my highly advantageous device, U.S. Pat. No. 3,501,099 to Benson discloses an electromechanical actuator which comprises a stack of piezoelectric material 12 which, when electrically excited, pushes a piston 18 forward into a chamber 20. Chamber 20 is filled with a fluid which is forced against valve body 26 when piston 18 pushed down, due to the expansion of the stack of piezoelectric material. As disclosed in column 2, line 68 to column 3, line 5, since the area of piston 18 is much greater than that of the exposed area of valve body 26, motion amplification to a degree that is proportional to the ratio of the surface areas is obtained. In addition to the FIG. 1 embodiment, Benson further shows additional embodiments which likewise use the expansion of a stack of piezoelectric material for urging against a large diameter piston, which in turn effects a motion amplification by a smaller diameter piston through a non-compressible fluid.

U.S. Pat. No. 3,877,226 to Blum discloses the use of both large and small diameter pistons for translating an abrupt linear motion of a cylinder into a longer duration, more uniform linear motion, with the movement of the small diameter pistons being amplified. In contrast to the present invention, there is no mention of using a stack of piezoelectric crystals as the urging force. Nor, for that matter, is there any mention of the use of an elastomer as the moving member.

U.S. Pat. No. 4,318,023 to O'Neill discloses an amplified piezoelectric actuator which does not use any elastomer for transferring the movement of one piston to the next.

U.S. Pat. No. 3,598,506 to O'Neill discloses the use of a stack of piezoelectric crystals for actuating a piston by means of a fluid. In contrast to the present invention, only one piston is disclosed in O'Neill.

In addition, the use of piezoelectric crystals for translational movement is well known, as witnessed by U.S. Pat. No. 3,551,764 to Evans wherein an electrically-powered actuator using a pair of piezoelectric elements is disclosed. Further showing a piezoelectric actuator is U.S. Pat. No. 4,471,256 to Igashira et al, wherein a stack of piezoelectric elements are used.

In summation, although the Benson patent shows the use of a stack of piezoelectric material, as well as large and small diameter pistons in order to accomplish motion amplification, it is quite clear that the novel and highly advantageous structural configuration shown in the present invention differs substantially and significantly from the embodiments shown by Benson.

DISCLOSURE OF INVENTION

The instant invention may be seen to comprise an electromechanical motion amplifier wherein a large diameter piston i s separated from a smaller diameter piston by force transmission means typically in the form of a medium such as may be formed from elastomeric material. The two pistons are arranged such that movement of the large piston in a positive direction along its longitudinal axis produces amplified movement of the smaller piston in a negative direction along the same axis. Piston movement may for example occur under the influence of a piezoelectric stack coupled to the large piston. The invention also includes a mechanism advantageously compensating for thermal effects.

Considering this invention in still further detail, it preferably pertains to a motion amplifier which uses a large diameter piston for effecting the movement of a smaller diameter piston. To displace the large diameter piston by a selected amount in a first direction, a stack of piezoelectric crystals may be used in accordance with this invention. As an electrical potential is applied thereto, the piezoelectric crystals expand longitudinally, there by urging the large diameter piston against a displaceable member, in this instance, an elastomer, which in turn is caused to move against the small diameter piston. The physical structural arrangement of the e invention is such that a small movement in the large diameter piston will advantageously effect a large displacement of the small diameter piston. Further disclosed in this invention is a second embodiment, which includes a temperature compensator.

It is therefore to be seen that a principal object of this invention is to provide a mechanical motion amplifier useful for controllably converting a variable input displacement into a linearly proportional, amplified output displacement, this being accomplished in this instance in a small device of minimal cost, which eliminates heavy and costly motor drives with complex feedback provisions.

It is another object of this invention to provide an electromechanical motion amplifier serving to controllably convert an input displacement into an amplified output displacement that may be in a direction opposite to the motion of the input, or, alternatively, in the same direction as the input motion.

It is still another object of this invention to pro vide a highly advantageous electromechanical motion amplifier using relatedly movable pistons located on a common axis, wherein the input displacement to one piston is readily and economically converted into an amplified output displacement of the other piston, in a direction opposite to the motion of the input.

It is yet still another object of this invention to provide a motion amplifying device advantageously utilizing an elastomer as the force transmission means between two interacting components.

It is yet another object of this invention to provide an electromechanical motion amplifier of the described type, in which a highly effective temperature compensating device is utilized therein.

It is yet another object of this invention to utilize the high power efficiency of in-line, small displacement actuation drives to achieve usable output motion, while requiring minimal input operating power.

It is yet another object of this invention to lend simplicity of design and fabrication using standard available materials and production processes.

Other objects, features and advantages of this invention will become more apparent as the description proceeds.

BEST MODE FOR CARRYING OUT THE INVENTION

Figure 1:
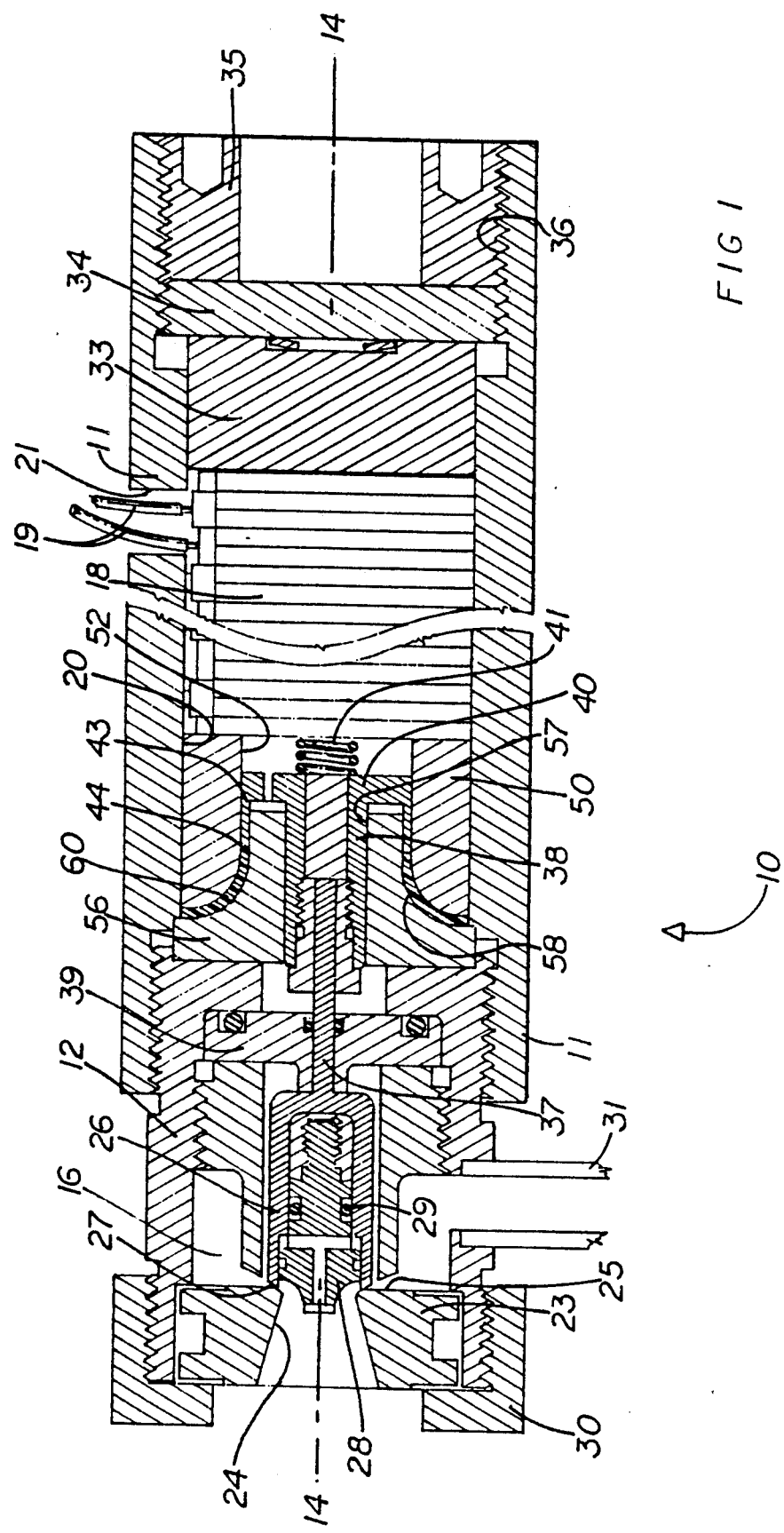
FIG. 1 is a cross sectional view to a large scale of an embodiment depicting the utility of my invention when coupled with a flow control device in a valving operation, the large and small pistons in this embodiment moving in opposite directions.

In FIG. 1 is revealed a first embodiment 10 of this invention, in this instance involving a flow control device in a valving operation. As will be noted from this figure, a housing 11 of generally cylindrical configuration is provided, which is threadedly engaged at its left end by a chamber-defining member 12. The longitudinal centerlines of the members 11 and 12 are disposed along principal longitudinal axis 14. In an interior portion of the housing 11 is a cylindrical portion 20, in which are contained several of the particularly significant components of this invention. In an interior portion of the chamber-defining member 12 is a generally cylindrically shaped chamber 16, to which fluid under pressure is supplied by inlet pipe 31. The construction and operation of the components contained in the interior of members 11 and 12 will shortly be made clear.

The chamber 16 is shown in FIG. 1 adjacent the left interior end of the device 10, with nozzle-defining member 23 forming the left wall or boundary of the chamber 16. Centrally located in the member 23 is nozzle 24, typically a divergent nozzle, out through which a flow of fluid from the chamber 16 can take place on occasion. Retainer 30, equipped with internal threads, threadedly engages the external threads located on the left end of the chamber-defining member 12, with the retainer 30 thus serving to hold the nozzle-defining member 23 in the desired operative position.

Also shown in FIG. 1 is a PZ stack 18, which is located in the cylindrical portion 20 of the member 11.

I prefer to regard the PZ stack as an assembly of crystalline structured wafers which exhibit dimensional changes (strain) in response to the application of an electrical field, and I may hereinafter refer to the PZ stack as an electrically extensible input displacement means. A bit more specifically, the PZ stack is typically made up of numerous thin wafers of ceramic, which wafers, for example, may each be on the order of 0.008 inches thick.

The stack 18 of wafers is caused to elongate in a well-known manner upon being energized by the application of a suitable direct current voltage, such as on the order of 500 volts D.C, with this elongation serving to impart an input displacement to an adjacent piston, as will be discussed shortly.

As will be noted, the right hand end of the PZ stack 18 as viewed in FIG. 1 abuts the end closure means 33, which is held in place by members 34 and 35 at the right hand end of the housing 11 of the device 10. The peripheral portion of the left end of the PZ stack 18 is in contact with the right hand end of a large piston 50 that is tightly yet slidably disposed in the cylindrical portion 20. The PZ stack and the piston 50 are symmetrically located about the centerline 14 of the device 10.

The PZ stack 18 is energized on occasion by virtue of the pair of insulated electric wires 19 passing through aperture 21, and it is to be realized that the stack may utilize piezoelectric, electrostrictive or magnetostrictive materials.

The right hand end of the exemplary embodiment of my device 10 illustrated in FIG. 1 is fixed, resulting from the use of the end closure means 33 which presents a very flat surface to stack 18, and which is held in place by the threaded members 34 and 35. The mechanical motion brought about by the excitation of the PZ stack is in the form of a push rather than a pull. The cylindrical portion 20 is configured so as not to interfere with expected expansion of the PZ stack 18 to the left, so inasmuch as the left hand end of the PZ stack is in contact with the right hand end of the slidably mounted piston 50, when excitation of the PZ stack is brought about, there will be a push against the end of the piston 50, causing it to move to the left. The piston 50 will be noted in FIG. 1 to be of a compound type, involving what may be called a piston-within-a-piston arrangement, and this aspect of my invention will be discussed shortly in more detail.

Disposed on longitudinal axis 14 in chamber 16 near the left hand end of the device 10 is a movable gate 26, equipped with a beveled sealing edge 27. The beveled sealing edge 27 is designed to interact with the circular seat 25 formed on the nozzle-defining member 23 around the perimeter of the nozzle 24. The movable gate 26 is slidably disposed on the fixed diverter 28, which is ported to facilitate pressure balancing. The diverter 28 is fixed to the member 39 by means of a member extending through a slot (not shown) through the gate 26, which slot is located to the right of 0-ring 29 on the diverter. The opposite end of movable gate 26 is supported by an elongate shaft portion 37, which is in turn slidably disposed in a fixed thermal barrier 39.

To the right of the thermal barrier 39 as viewed in FIG. 1, the shaft portion 37 enlarges to form a portion 38 that is slidably disposed in an elongate aperture 57 in the center of a fixed member 56. As later discussed, fixed member 56 is known as the anvil member. A small piston 40 is formed on the opposite end of the shaft 37-38 from the movable gate 26. The small piston 40 is symmetrically located along the centerline 14, being slidably yet tightly disposed in an elongate, generally cylindrical central cavity 52 contained within the middle of the large piston 50. The piston 40 has a circumferential portion 43 on the edge toward the anvil member 56, the significance of which will be discussed hereinafter. A compression spring 41 is preferably used in order to maintain a positive pressure on the hydraulic medium during storage.

Provided in the cylinder portion 20 of the housing 11 in accordance with this invention is located the fixed anvil 56, the anvil being held firmly in place by virtue of its peripheral portion being tightly disposed between the housing members 11 and 12. The right hand end of the anvil 56 may be regarded as having a generally conical surface 58, and it is important to note that the end of the piston 50 closest to this generally conical surface of the anvil is configured in close conformity to this surface 58 of the anvil 56. Disposed between the generally conical surface 58 and the side or end of large piston 50 away from the PZ stack 18 is a force transmission means, in this instance an elastomer 60. What may be regarded in FIG. 1 as the left hand end of elastomer 60 is in contact with the interior cylindrical portion 20 of the main housing 11, where it is restrained against movement.

The arrangement is such that upon the large piston 50 being caused under the influence of the expanding PZ stack 18 to move to the left as viewed in FIG. 1, the elastomer 60 is pressed by the piston tightly against the generally conical surface 58 of the anvil 56. Inasmuch as the anvil is fixed and cannot move to the left, the elastomer 60 is subjected to a considerable squeezing force, causing the right hand end of the elastomer 60 to move to the right, where it contacts the circumferential surface 43 of the small piston 40 at the location 44, causing the piston 40 to move to the right as viewed in this figure. This movement of the small piston 40 in the opposite direction to the leftward movement of the large piston 50 as viewed in FIG. 1, is permitted in view of the comparatively long inner cavity 52 in the central interior of the large piston 50.

Upon the small piston 40 thus moving to the right, this causes the beveled sealing edge 27 of the movable gate 26 to move to the right, away from the circular seat 25 disposed on the member 23 around the entrance to the nozzle 24.

Inlet pipe 31 supplies fluid under pressure to chamber 16, as previously mentioned, and the movement of the beveled sealing edge 27 away from the seat 25 permits the flow of fluid out of the chamber 16, to exit through the nozzle 24. The fluid is typically a gas such as stored cold gas or propellant generated hot gas, the selection depending upon the specific task to be accomplished.

It is thus to be seen that this embodiment of my invention enables the conversion of a very small linear input motion into a large output motion, accomplished by the use of pistons of different areas and by the advantageous use of an elastomer as the force transmission means, in lieu of the more conventional hydraulic fluid.

It is significant to note that whereas the large piston 50 had been caused by the energized PZ stack 18 to move to the left as viewed in FIG. 1, because of the novel arrangement in accordance with this invention, the small piston 40 has been caused to move along the principal longitudinal axis 14 in the opposite direction, which is to the right as viewed in FIG. 1.

It is therefore to be seen that the expansion of the PZ stack under the influence of the electrical field brings about a commensurate motion of the large piston 50 in one direction, as well as an amplified motion in the opposite direction of the small piston 40 and the beveled sealing edge 27 of the movable gate 26.

This advantageous action is fast and accurate, and is directly employable for a number of useful purposes.

Figure 2:
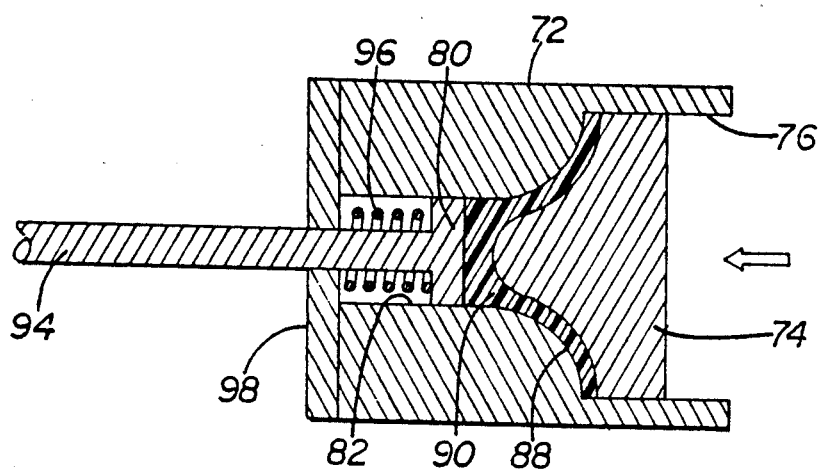
FIG. 2 is a somewhat simplified cross sectional view of an embodiment generally similar to the device shown in FIG. 1, except it is here shown that the large and small pistons move in the same direction.

As will be apparent by referring to FIG. 2, I am not limited to the small piston 80 being movable in the opposite direction to the motion of the large piston, and in this figure it is to be seen that housing 72 is provided with a large piston 74 slidable in a large cylinder 76, whereas small piston 80 is slidable in a small cylinder 82.

The interior of housing 72 is configured into a smoothly curved portion or surface 88 extending between the large cylinder 76 and the small cylinder 82, and the interior of the large piston 74 is shaped to have substantially the same configuration as the adjacent curved portion 88. The right hand end of large piston 74 is substantially flat, and configured to be contacted, for example, by a PZ stack.

Disposed between the interior end of the large piston 74 and the curved surface 88 is the elastomer 90, which may be regarded as captive in this location. The interior surface of the large cylinder prevents movement of the elastomer. Thus, when the large piston 74 is caused to move one increment to the left as viewed in FIG. 2, such as by an expanding PZ stack, that causes the interior portion of the elastomer 90 to move several increments to the left, causing a multiplied motion to the left of the small piston 80, and a commensurate movement of the shaft 94 to which it is attached.

I prefer to utilize a bias spring 96 around the shaft 94, between the underside of the small piston 80, and the closure member 98.

The direction of motion undertaken by the second or smaller piston is strictly a function of the driven valve's design. A primary consideration is with regard to the materials of which the valve stem is constructed, and the presence of tensile or compressive stresses therein.

When opposing piston motions are utilized, such as in FIG. 1, it is preferable from the valve designer's standpoint to design a valve with a closing pressure bias. This is because that type of design results in a fail-safe closed condition, and in addition, seat leakage is minimized.

To achieve these advantages, the actuator must exert a pull force on the valve stem, which of course represents a tensile loading condition. For gas temperatures below 3000° F., heat resistant metals with good tensile properties can be utilized, and it is anticipated that most valves will be designed this way.

On the other hand, when both pistons are moving the same general direction, as in FIG. 2, and comparatively high temperatures are involved, the valve stem will be ma de of fragile carbon/carbon or refractory ceramic materials which have very poor tensile strength and poor bending properties but fairly good compressive strength.

Accordingly, the valve must be designed with an opening pressure bias so that the actuator must push on the valve stem to effect a closing of the valve. Such a bias is provided in FIG. 2 by the spring 96.

Figure 3:
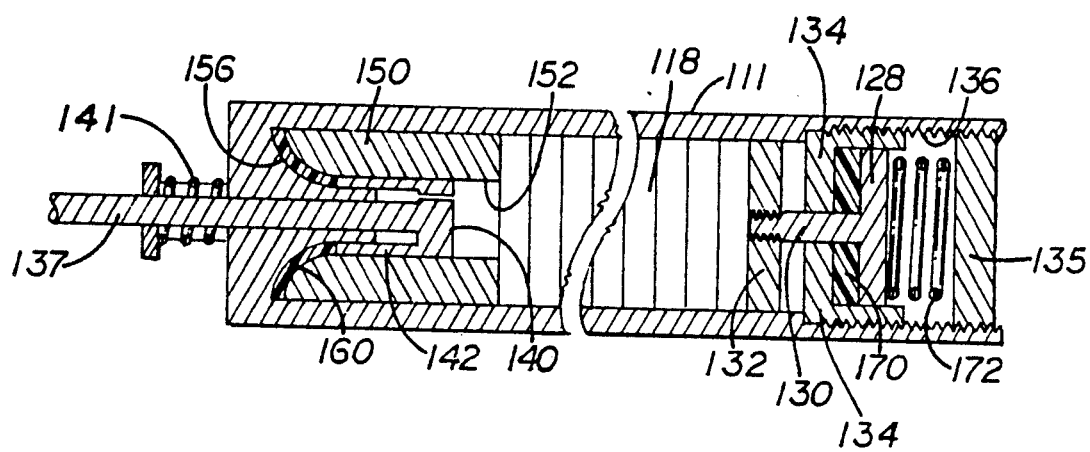
FIG. 3 is a cross sectional view to a somewhat smaller scale of an embodiment of my invention generally similar to the device shown in FIG. 1, this view revealing the advantageous utilization of a temperature compensating arrangement.

Turning now to FIG. 3, it will there be seen that I have provided an embodiment of this invention wherein a highly effective compensation for temperature changes has been provided. In this instance, the housing 111, like housing 11 in FIG. 1, is generally cylindrical, and operatively mounted in housing 111 is a PZ stack 118. The right hand end of the housing 111 is provided with internal threads 136, and in these threads an elastomer seat member 134 is received. The seat member 134 is somewhat cup shaped, and contained therein is the elastomer 170.

From the use of reference numbers in FIG. 3 that bear a noticeable similarity to certain reference numerals used in FIG. 1, the reader can deduce construction and operation of many portions of the device shown in FIG. 3, without a specific description thereof being necessary in each instance. For example, large piston 150 in the embodiment depicted in FIG. 3 is analogous to piston 50 utilized in the embodiment of FIG. 1, and small piston 140 is analogous to piston 40 in FIG. 1.

Also received in the threads 136 disposed around the interior of the right hand end of the housing 111 in FIG. 3 is an end plug 135, which has screw threads around its periphery to engage interior threads 136. In this way, the end plug can be unscrewed if access ever need be established to the interior portion of this embodiment of my device.

Stack positioner piston 128 is sized to fit in the interior portion of the cup shaped seat member 134, and in a central portion of the left side of this piston 128 as viewed in FIG. 3 is a shaft 130, which passes in sealed relation through a hole centrally located in the member 134. The remote end of the shaft 130 is threaded so that it can tightly engage a PZ contacting member 132.

A compression spring 172 extends between the interior side of the end plug 135 and the stack positioner piston 128 to pro vide a suitable bias, serving to keep member 132 tightly engaging the right hand end of PZ stack 118.

The left hand end of the housing 111 has a curved interior portion or surface 156, which is fixed. This portion or surface is configured in a similar manner to the fixed anvil 56 to be found in FIG. 1.

Large piston 150 has a curvature on its left end as viewed in FIG. 3, that is complementary to the configuration of the fixed surface 156, whereas the essentially flat right hand end of piston 150 is in firm contact with the PZ stack 118.

Disposed between the piston 150 and the curved, fixed interior portion 156 is the elastomer 160, with sufficient elastomer being utilized that a portion of the elastomer makes firm contact with the undersurface 142 of the small piston 140. Piston 140 is slidable in cylinder 152 that is disposed in a central portion of the piston 150.

Attached to the small piston 140 is an elongate shaft portion 137, to be seen at the left hand side of FIG. 3, and it is the motion of the shaft 137 that represents the useful output of this embodiment of my device. Spring 141 provides bias in order to maintain positive pressure on the hydraulic medium during storage.

As in the embodiment of FIG. 1, the PZ stack 118 is electrically connected such that in the presence of an electric field it expands and bears against the piston 150 in FIG. 3, with motion of the piston 150 to the left necessarily controlling the position of the elastomer 160. Because the elastomer 160 cannot expand outwardly because of the cylinder wall, or in any other direction, when the large piston 150 is moved to the left by the PZ stack expanding, the elastomer 160 moves toward the undersurface 142 of the small piston 140, causing this piston as well as the shaft 137 to move to the right as viewed in FIG. 3.

As should now be apparent, in the presence of a temperature change, the elastomer 160 will change its properties, which might well bring about substantial errors in the way that the small piston 140, and therefor shaft 137 is caused to move. Because of the inclusion of the elastomer 170 at the right hand end of this embodiment of my invention, the change of length of the elastomer 160 is exactly balanced by the change of length of the elastomer 170, thus bringing about a highly accurate compensation for temperature changes in accordance with this invention.

I claim:

1. A mechanical motion amplifier useful for controllably converting an input displacement into an amplified output displacement, comprising:
    (a) a first piston movable within a predetermined range of travel along an axis in response to said input displacement,
    (b) a second piston movable within a predetermined amplified range of travel along an axis,
    (c) force transmission means cooperating with said first and second pistons for effecting movement of said second piston in response to movement of said first piston, said force transmission means being an elastomer, and wherein.
    (d) the relationship between said first and second pistons is such that movement of said first piston produces amplified movement of said second piston along its axis.

2. The mechanical motion amplifier as recited in claim 1 in which said second piston is connected to a valve located in a nearby chamber, so as to directly control the positioning of said valve, with said valve being designed to interact with a valve seat located on an outlet in the sidewall of said chamber, said chamber being designed to contain a fluid under pressure, the positioning of said valve with respect to said valve seat therefore serving to selectively control the flow of such fluid out of said chamber.

3. The mechanical motion amplifier as recited in claim 1 in which said first and second pistons are movable along the same axis.

4. A mechanical motion amplifier useful for controllably converting an input displacement into an amplifier output displacement, comprising:
    (a) a first piston movable within a predetermined range of travel along an axis in response to said input displacement,
    (b) a second piston movable within a predetermined amplified range of travel along an axis,
    (c) force transmission means cooperating with said first and second pistons for effecting movement of said second piston in response to movement of said first piston, said force transmission means being an elastomer, and wherein
    (d) the relationship between said first and second pistons being such that movement of said first piston produces amplified movement of said second piston along the same axis as the first piston, said amplified movement of said second piston being in the opposite direction to the direction of movement of said first piston.

5. The mechanical motion amplifier as recited in claim 3 in which said amplified movement of said second piston is in the same direction as the direction of movement of said first piston.

6. A mechanical motion amplifier useful for controllably converting an input displacement into an amplified output displacement, comprising:
  (a) a housing having a principal longitudinal axis,
  (b) a first piston disposed in said housing and movable within a predetermined range of travel along said principal longitudinal axis in response to such input displacement, said first piston having an elongate central cavity in its interior, located on said principal longitudinal axis,
  (c) a second piston disposed in said elongate central cavity and movable within a predetermined amplified range of travel along said principal longitudinal axis,
  (d) force transmission means cooperating with said first and second pistons for effecting movement of said second piston along said principal longitudinal axis in response to movement of said first piston, and wherein
  (e) the relationship between said first and second pistons is such that movement of said first piston in a first direction along said principal longitudinal axis produces amplified movement of said second piston along said axis.

7. The mechanical motion amplifier as recited in claim 6 in which said amplified movement of said second piston is in the opposite direction to the direction of movement of said first piston.

8. The mechanical motion amplifier as recited in claim 6 in which said amplified movement of said second piston is in the same direction as the direction of movement of said first piston.

9. The mechanical motion amplifier as recited in claim 6 in which said force transmission means is an elastomer.

10. The mechanical motion amplifier as recited in claim 6 in which said second piston is connected to a valve located in a nearby chamber, so as to directly control the positioning of said valve, with said valve being designed to interact with a valve seat located on an outlet in the sidewall of said chamber, said chamber being designed to contain a fluid under pressure, the positioning of said valve with respect to said valve seat therefore serving to selectively control the flow of such fluid out of said chamber.

11. An electromechanical motion amplifier useful for controllably converting an input displacement into an amplified output displacement, comprising:
  (a) a first piston movable within a predetermined range of travel along an axis in response to said input displacement,
  (b) electrically extensible input displacement means cooperating with said first piston for imparting said input displacement to said first piston,
  (c) a second piston movable within a predetermined amplified range of travel along an axis,
  (d) force transmission means cooperating with said first and second pistons for effecting movement of said second piston in response to movement of said first piston, and wherein
  (e) the relationship between said first and second pistons being such that movement of said first piston produces amplified movement of said second piston along its axis, but in a direction opposite to the movement of said first piston.

12. The electromechanical motion amplifier as recited in claim 11 in which said second piston is connected to a valve located in a nearby chamber, so as to directly control the positioning of said valve, with said valve being designed to interact with a valve seat located on an outlet in the sidewall of said chamber, said chamber being designed to contain a fluid under pressure, the positioning of said valve with respect to said valve seat therefore serving to selectively control the flow of such fluid out of said chamber.

13. The electromechanical motion amplifier as recited in claim 11 in which said electrically extensible input displacement means is a PZ stack.

14. The electromechanical motion amplifier as recited in claim 11 in which said first and second pistons are movable along the same axis.

15. The electromechanical motion amplifier as recited in claim 11 in which said force transmission means is an elastomer.

* * * * *